United States Patent [19]
Schaffhausen et al.

[11] 4,444,956
[45] Apr. 24, 1984

[54] PROCESS FOR PREPARATION OF MANNICH CONDENSATION PRODUCT

[75] Inventors: John G. Schaffhausen, Naperville Township, DuPage County; Adel B. Abdul-Malek, Naperville, both of Ill.

[73] Assignee: Standard Oil Company (Indiana), Chicago, Ill.

[21] Appl. No.: 439,863

[22] Filed: Nov. 8, 1982

[51] Int. Cl.$^3$ .......................... C08G 12/06; C08F 8/34
[52] U.S. Cl. ...................................... 525/164; 252/33; 525/331.8; 525/333.9
[58] Field of Search .................. 525/164, 331.8, 333.9; 252/33

[56] References Cited
U.S. PATENT DOCUMENTS

| | | |
|---|---|---|
| 3,544,520 | 12/1970 | Culbertson et al. ................ 525/164 |
| 3,872,019 | 3/1975 | Culbertson et al. ................ 525/164 |
| 4,011,380 | 3/1977 | West et al. ........................ 525/164 |
| 4,131,553 | 12/1978 | West ................................. 525/346 |

Primary Examiner—Theodore E. Pertilla
Attorney, Agent, or Firm—Richard A. Kretchmer; William T. McClain; William H. Magidson

[57] ABSTRACT

A process for the preparation of oil-soluble Mannich condensation products wherein an amine is prereacted with a sulfonic acid or ammonium sulfonate, and the prereaction product is reacted with an aldehyde and an oxidized olefin polymer.

13 Claims, No Drawings

PROCESS FOR PREPARATION OF MANNICH CONDENSATION PRODUCT

BACKGROUND OF THE INVENTION

1. Field of the Invention

This invention relates to a method of preparing oil-soluble Mannich condensation products from oxidized olefin polymers, amines and aldehydes. More particularly, it relates to a process for preparing oil-soluble Mannich condensation products wherein the amine is prereacted with a sulfonic acid or an ammonium sulfonate before contact with the oxidized olefin polymer and the aldehyde.

2. Description of the Prior Art

The operation of diesel and spark ignition internal combustion engines is typically accompanied by lubricant deterioration, which results in the formation of sludge, lacquer and resinous deposits on interior engine surfaces. These lubricant deterioration products reduce engine efficiency and accelerate engine wear. In order to prevent or reduce the formation of these deposits, a wide variety of chemical additives have been developed for incorporation into lubricating oils. These additives, which are commonly referred to as detergents or dispersants, have the ability to keep deposit-forming materials suspended in the oil so that the engine remains in a clean and efficient operating condition for extended periods of time.

Lubricating oils have a tendency to become thin at elevated temperatures while becoming thick at low temperatures. In the case of a crankcase lubricating oil, it is desirable that the oil not become so thick in a cold engine that starting is difficult. On the other hand, the oil must remain sufficiently viscous in a hot engine so that an oil film is maintained between the moving parts. As a consequence, it is frequently necessary to incorporate additives into lubricating oils which serve to improve the viscosity-temperature relationship. Additives which have the ability to reduce the variation with temperature of the viscosity of a lubricating oil are commonly referred to as viscosity index improvers.

U.S. Pat. No. 3,872,019, issued to Culbertson et al. on Mar. 18, 1982, discloses and claims lubricant additives which exhibit both dispersant and viscosity index improving properties. These additives are obtained by the Mannich condensation of an oxidized, high molecular weight, amorphous ethylene-propylene copolymer with a formaldehyde-yielding reactant and a primary or secondary amine or polyamine. This patent does not, however, either teach or suggest the use of a sulfonic acid or ammonium sulfonate in the condensation process.

U.S. Pat. No. 4,131,553, issued to West on Dec. 26, 1978, is also directed to oil-soluble Mannich condensation products which possess both dispersant and viscosity index improving properties when added to a lubricating oil. This patent discloses that such products can be prepared by reacting a high molecular weight, oxidized, amorphous addition polymer with a formaldehyde-yielding reagent and an amine in the presence of an oil-soluble sulfonic acid. However, this patent teaches that the sulfonic acid must be added during the Mannich condensation reaction of the oxidized copolymer, at the same time as, or after the addition of the amine. The patent fails to teach the prereaction of amine and sulfonic acid and fails to suggest that such a procedure would be desirable.

SUMMARY OF THE INVENTION

The present invention is directed to the discovery of an improved process for the preparation of oil-soluble Mannich condensation products which involves the reaction of an aldehyde and oxidized olefin polymer with an amine which has been prereacted with a sulfonic acid or ammonium sulfonate.

One embodiment of the invention is a process for the preparation of an oil-soluble condensation product which comprises: (a) reacting at least one amine selected from the group consisting of primary and secondary aliphatic amines having from 1 to about 24 carbon atoms, aliphatic diamines of the formula $H_2N(CH_2)_xNH_2$ wherein x is an integer from 3 to about 10, and polyamines of the formula $H_2N(A\!-\!NH)_yH$ wherein A is a divalent alkylene radical of from 2 to about 6 carbon atoms and y is an integer from 1 to about 10, with at least one sulfur-containing material selected from the group consisting of oil-soluble sulfonic acids and their ammonium salts, wherein the ratio of equivalents of said sulfur-containing material to equivalents of said amine is from about 0.05 to about 10; and (b) reacting the product of (a) with formaldehyde or a formaldehyde-yielding reagent and an oxidized polymer wherein said oxidized polymer is derived from an amorphous olefin polymer and has a number average molecular weight of at least about 3,000.

Another embodiment of the invention is the product of the above-described process.

An object of this invention is to provide a new process for the preparation of oil-soluble Mannich condensation products.

Another object of this invention is to provide an improved process for the preparation of oil-soluble Mannich condensation products.

Another object of this invention is to provide a Mannich condensation process which is easier to carry out in commercial facilities.

A further object of this invention is to provide an oil-soluble Mannich condensation product having improved filterability properties.

A still further object of the invention is to provide an oil-soluble Mannich condensation product having reduced haze and sediment.

DETAILED DESCRIPTION OF THE INVENTION

We have found that oil-soluble Mannich condensation products prepared in accordance with this invention possess excellent dispersancy and viscosity improving properties when incorporated into lubricating oils. In addition, the Mannich products of this invention also possess improved filterability and reduced haze or sediment in comparison with prior art products. In particular, the subject invention is an improvement in the process which is disclosed by the above-mentioned U.S. Pat. No. 4,131,553 to West. This patent is hereby incorporated in its entirety by reference.

As used herein, the terminology amorphous olefin polymer refers to amorphous addition polymers derived from olefinically unsaturated hydrocarbon monomers or mixtures thereof. Such olefin monomers include olefins of the formula $R\!-\!CH\!=\!CH_2$ wherein R is selected from the group consisting of hydrogen and aliphatic groups of from 1 to about 20 carbon atoms. Suitable olefin monomers include, but are not limited to, ethylene, propylene, isobutylene, 1-butene, 1-hexene, and 4-methyl-1-pentene. Olefin monomers having a plurality of double bonds and containing from 4 to about 25 carbon atoms can also be used. Suitable monomers containing a plurality of double bonds include, for example, 1,3-butadiene, 1,4-hexadiene, 1,4-pentadiene, 2-methyl-1,5-hexadiene, 1,7-octadiene, 5-methylene-2-norbornene, and norbornadiene.

Preferred amorphous olefin polymers are derived from about 30 to about 80 mole percent ethylene and from about 20 to about 70 mole percent of at least one comonomer selected from the group consisting of olefins of the formula $R-CH=CH_2$ where R is an aliphatic group of from 1 to about 20 carbon atoms and diolefins of from 4 to about 25 carbon atoms.

Highly preferred amorphous olefin polymers include ethylene-propylene copolymers which are derived from about 35 to about 80 and preferably from about 55 to about 65 mole percent of ethylene, and from about 20 to about 65 and preferably from about 35 to about 45 mole percent of propylene. These ethylene-propylene copolymers have a number average molecular weight in the range from about 5,000 to about 200,000, preferably from about 20,000 to about 70,000, and contain at least 100 pendant methyl groups per 1,000 chain carbon atoms.

Methods for the preparation of the amorphous olefin polymers are well known. For example, methods for the preparation of such polymers are described in U.S. Pat. Nos. 2,700,633; 2,726,231; 2,933,480; 3,000,866; 3,063,973; 3,093,621; and 3,872,019.

The amorphous olefin polymer must be oxidized prior to use in the process of this invention. The oxidation can be accomplished by contacting the polymer at a suitable temperature and pressure with an oxidizing agent such as air, free oxygen, or any oxygen-containing material which is capable of releasing oxygen under the oxidation conditions selected. If desired, the oxidation can be conducted in the presence of known oxidation catalysts, such as platinum or a platinum group metal and compounds containing metals such as copper, iron, cobalt, cadmium, manganese, and vanadium. The oxidation can be carried out, for example, by the methods which are described in U.S. Pat. Nos. 2,982,728; 3,153,025; 3,316,177; 3,365,499; 3,544,520 and 4,011,380. The aforementioned U.S. Pat. No. 4,011,380 to West et al. is hereby incorporated in its entirety by reference.

Depending on the activity of the specific oxidizing agent and the rate of reaction desired, the oxidation of the olefin polymer can be carried out over a wide temperature range. With an active oxidizing agent such as sulfur trioxide, temperatures in the range from about −40° to about 200° C. can be used. On the other hand, with less active oxidizing agents such as air, temperatures in the range from about 40° to about 430° C. can be used. The amorphous olefin polymer is desirably dissolved in oil prior to the oxidation in order to provide a reaction mixture of convenient viscosity. Reaction parameters such as temperature, pressure, oxidizing agent, concentration of oxidizing agent, and oxidation catalyst, if any, are selected and controlled in a conventional manner to obtain optimum results.

The oxidized olefin polymer for use in the process of this invention desirably has a number average molecular weight of at least about 3,000, preferably from about 10,000 to about 100,000, and more preferably from about 10,000 to about 50,000. In addition, the ratio of the weight average to the number average molecular weight ($\overline{M}_w/\overline{M}_n$) of the oxidized polymer is desirably less than about 6 and preferably less than about 3. Although the invention is not to be so limited, the oxidized olefin polymer is believed to comprise a degradation product of lower molecular weight than the amorphous olefin polymer starting material which contains ketone carbonyl groups.

Suitable aldehydes for use in the practice of this invention include low molecular weight aliphatic aldehydes of from 1 to about 5 carbon atoms. Such aldehydes include, for example, formaldehyde, acetaldehyde, propionaldehyde and n-butyraldehyde. However, the use of formaldehyde or a formaldehyde-yielding reagent, such as formalin and paraformaldehyde, is highly preferred.

Amines which are suitable for use in the process of this invention include amines which are selected from the group consisting of primary and secondary aliphatic amines having from 1 to about 24 carbon atoms, aliphatic diamines of the formula $H_2N(CH_2)_xNH_2$ wherein x is an integer from 3 to about 10, and polyamines of the formula $H_2N(A-NH)_yH$ wherein A is a divalent alkylene radical of from 2 to about 6 carbon atoms and y is an integer from 1 to about 10. Suitable primary and secondary aliphatic amines are those of the formula $R^1R^2NH$ wherein $R^1$ is selected from the group consisting of hydrogen and aliphatic groups containing from 1 to about 12 carbon atoms, and $R^2$ is selected from the group consisting of aliphatic groups containing from 1 to about 12 carbon atoms. The group of amines which is suitable for use in this invention includes, but is not limited to, methylamine, dibutylamine, cyclohexylamine, propylamine, decylamine, ethylenediamine, 1,3-diaminopropane, 1,4-diaminopropane, 1,6-diaminohexane, diethylenetriamine, triethylenetetramine, tetraethylenepentamine, tripropylenetetramine, and tetrapropylenepentamine.

The oil-soluble sulfonic acids which are suitable for use in the practice of this invention are desirably hydrocarbyl sulfonic acids which have an equivalent weight in the range from about 250 to about 2,000, and preferably from about 400 to about 1,000. In more detail, these sulfonic acids can be represented by formulas I and II:

$$(R^1)_x\text{-Ar-}(SO_3H)_y \qquad\qquad \text{I}$$

$$R^2\text{-}(SO_3H)_z \qquad\qquad \text{II}$$

In formula I, Ar is a cyclic organic nucleus of the mono- or polynuclear type, including benzenoid or heterocyclic nuclei such as that of benzene, naphthalene, anthracene, 1,2,3,4-tetrahydronaphthalene, thianthrene or biphenyl and the like. Preferably, however, Ar is an aromatic hydrocarbon nucleus, especially a benzene or naphthalene nucleus. $R^1$ is an aliphatic or substituted aliphatic group, examples of which include alkyl, alkenyl, alkoxy, alkoxyalkyl, carboalkoxyalkyl, and aralkyl groups. Both x and y are independently an integer which is at least 1, with the proviso that the variables represented by $(R^1)_x$ are such that the acid is oil-soluble. This means that the groups represented by $(R^1)_x$ should provide at least about eight aliphatic carbon atoms per molecule of sulfonic acid, and preferably at least about twelve aliphatic carbon atoms. Preferably, x and y are integers of from 1 to 3. Finally, the $R^1$ and Ar groups in formula I can carry substituents such as hydroxy, mercapto, halogen, amino, carboxy, lower carboalkoxy, and the like so long as the essentially hydrocarbon character of the groups is not destroyed.

In formula II, $R^2$ is an aliphatic or substituted aliphatic group which desirably contains a total of at least about 12 carbon atoms. Examples of suitable $R^2$ groups include alkyl, alkenyl, and alkoxyalkyl groups and also substituted alicyclic groups wherein the substituents are alkoxy, alkoxyalkyl, and carboalkoxyalkyl. Generally, the alicyclic group is a cycloalkane nucleus such as cyclopentane, cyclohexane, cyclohexene, and the like. Specific examples of $R^2$ include cetylcyclohexyl, laurylcyclohexyl, ethoxycetyl and octadecenyl as well as groups derived from paraffin waxes and polyolefins, including polymerized mono- and diolefins containing from about 1 to 8 carbon atoms per olefin monomer unit. The $R^2$ group in formula II can carry substituents such as hydroxy, mercapto, halogen, amino, carboxy, carboalkoxy and the like so long as the essentially hydrocarbon character of the group is not destroyed. Finally, z in formula II is an integer of from 1 to 3.

Illustrative examples of suitable sulfonic acids include mahogany sulfonic acids, petrolatum sulfonic acids, mono- and polywax-substituted naphthalene sulfonic acids, polyolefin-substituted benzene sulfonic acids, dilaurylbenzene sulfonic acids, laurylcetylbenzene sulfonic acids, cetylchlorobenzene sulfonic acids, cetylphenol sulfonic acids, cetylphenol disulfide sulfonic acids, dilauryl-beta-naphthol sulfonic acids, paraffin wax sulfonic acids, petroleum naphthene sulfonic acids, laurylcyclohexyl sulfonic acids, mono-and polywax-substituted cyclohexyl sulfonic acids and the like.

Suitable polyolefin-substituted benzene sulfonic acids for use in this invention include polypropylenealkylated benzene sulfonic acids and polybutylenealkylated benzene sulfonic acids wherein the polypropylene and polybutylene substituents have a molecular weight of at least about 100, desirably within the range of about 100 to about 1900, and preferably from about 250 to about 850. Other suitable oil-soluble sulfonic acids are well described in the art including, for example, U.S. Pat. Nos. 2,616,604; 2,626,207; and 2,767,209.

Aromatic sulfonic acids of the type set forth in formula I are generally preferred over the aliphatic sulfonic acids of formula II in view of their ready availability and somewhat greater thermal stability at elevated temperatures.

Ammonium sulfonates which are suitable for use in the practice of this invention are derived from the above-described oil-soluble sulfonic acids. These ammonium salts can be obtained, for example, by neutralization of the sulfonic acids with ammonia gas or with ammonium hydroxide. It will be appreciated that the sulfonic acid can be at any convenient temperature and in a suitable solvent or neat during the neutralization.

In practice of this invention, the amine is prereacted with the sulfonic acid or its ammonium salt. The ratio of equivalents of sulfonic acid or its ammonium salt to equivalents of amine used in the preparation of this prereaction product is desirably from about 0.05 to about 10 and preferably from about 0.1 to about 1. Although any suitable reaction temperature can be used, the reaction temperature is desirably between about 0° and about 250° C., and preferably between about 10° and about 150° C. The prereaction product can be prepared in the presence of a nonreactive solvent or diluent, if desired. However, the reaction is preferably carried out in the absence of diluents and at a temperature at which the amine is a liquid. In particular, the amine is preferably substantially anhydrous. If desired, the prereaction product can be prepared and stored for substantial periods of time prior to use.

The prereaction product of the amine with the sulfonic acid or its ammonium salt is condensed in a second step with the oxidized olefin polymer and aldehyde. In this second step, the prereaction product, oxidized olefin polymer, and aldehyde can be combined simultaneously or in any order. The mole ratio of oxidized olefin polymer to aldehyde to amine in the prereaction product is desirably in the range from about 1:2:2 to about 1:500:500 (based on the number average molecular weight of the oxidized olefin polymer and either the amount of aldehyde or the potential amount of aldehyde represented by an aldehyde-yielding reagent) and preferably from about 1:25:25 to about 1:500:500. Although any suitable reaction temperature can be used for this second step, the reaction temperature is desirably between about 0° and about 300° C. and preferably between about 50° and about 250° C. Although not necessary, the condensation is desirably conducted in the presence of a solvent or diluent, for example, an aromatic hydrocarbon solvent such as benzene, toluene, and xylene or an aliphatic hydrocarbon solvent such as hexane. A low viscosity hydrocarbon oil such as a solvent-extracted SAE 5W mineral oil is particularly suitable as a solvent or diluent. Since the oxidized olefin polymer is conveniently prepared by oxidation of the polymer in a neutral mineral oil, this same mineral oil is also a preferred diluent for use in the second step condensation reaction of this invention. The use of a solvent is advantageous to facilitate the mixing of the reactants and for control of the reaction temperature.

If desired, the precondensation of the amine with the sulfonic acid and/or ammonium sulfonate, and the second step condensation reaction between the precondensation product, oxidized olefin polymer, and aldehyde can be carried out under an inert atmosphere, such as nitrogen, in order to prevent any possible oxidative degradation by air.

Although the process of this invention is not to be so limited, it is believed to represent a variation of the Mannich reaction. That is to say, it is believed that the process of this invention involves the replacement of active hydrogen atoms in the oxidized olefin polymer by substituted aminomethyl groups. The subject process results in the formation of a nitrogen-containing product which possesses dispersant properties and is also an excellent viscosity index improver.

The chemical composition of the product obtained by the process of this invention cannot be characterized by a precise structural formula. While it is believed that the oxidation of the olefin polymer produces large amounts of ketones, it is known that minor amounts of aldehydes, acids and perhaps esters may also be present. In view of the complex chemical character of the oxidized olefin polymer, this material must be defined by its method of preparation. Since such an oxidized olefin polymer is a starting material for the process of this invention, the resulting product must also be defined by its method of preparation.

The Mannich products prepared in accordance with the process of this invention can be incorporated into a lubricating oil by simple mixing. Suitable lubricating oils include, for example, mineral oils; synthetic materials such as olefin polymers, polyoxypropylene and certain dicarboxylic acid esters; vegetable oils such as cottonseed oil, corn oil and castor oil; and animal oils such as lard oil and sperm oil. A lubricating oil composition will typically comprise a major portion of a lubricating oil in combination with the Mannich product, wherein the amount of Mannich product is from about 0.01 to about 5 weight percent of the lubricating oil composition.

Concentrates containing from about 5 to about 75 weight percent or more of the subject Mannich product in a suitable base oil, either alone or in combination with other well known lubricant additives, can be used for blending with lubricating oils in the proportions desired for particular conditions or used to give a finished product containing from about 0.01 to about 5 weight percent of the Mannich product.

The Mannich product of this invention can be used in combination with other conventional lubricating oil additives which include, but are not limited to, wear inhibitors, extreme pressure agents, friction modifiers, antioxidants, corrosion inhibitors, detergents, dispersants, antifoam agents, viscosity index improvers, and pour point depressants.

The following examples are intended only to llustrate the invention and are not to be construed as imposing limitations on it.

EXAMPLE I

A 100 gram portion (0.13 equivalent) of the ammonium salt of a polypropylene-substituted benzene sulfonic acid having a molecular weight of 782 was heated with stirring to 104° C. under nitrogen, and 60.3 grams (0.52 equivalent) of hexamethylenediamine (98% pure, mp 40°-42° C.) which had been heated to the liquid state was added in portions over a period of about 10 minutes. After completion of the hexamethylenediamine addition, stirring was continued for one hour. The resulting product is stable for at least one month.

EXAMPLE II

To 319.8 grams (0.41 equivalent) of the ammonium sulfonate described in Example I were added, at room temperature with stirring and under nitrogen, 200 grams (1.69 equivalents) of hexamethylenediamine (98% pure, mp 40°-42° C.) which had been warmed to the liquid state. The temperature of the reation mixture rose from 28° C. to 38° C. during the addition period, and an evolution of ammonia resulted in foaming during the initial stages of the reaction. The foaming was controlled by addition of a trace of a polymethylsiloxane antifoaming agent.

EXAMPLE III

To 319.8 grams (0.41 equivalent) of the ammonium sulfonate described in Example I were added, at room temperature with stirring and under nitrogen, 285 grams (1.72 equivalents) of a 70% aqueous solution of hexamethylenediamine. Heavy foaming was observed during the first one-third of the addition. The resulting product was low in viscosity, homogeneous at room temperature, and analyzed for 8.07% nitrogen.

EXAMPLE IV

A 7.0% solution of an amorphous ethylene-propylene copolymer (containing about 60 mole percent ethylene and having a number average molecular weight of about 60,000) in a 100 neutral mineral oil, which also contained about 0.2 weight percent of an overbased magnesium alkylbenzene sulfonic acid and about 0.2 weight percent of an alkylbenzene sulfonic acid, was treated with a 50/50 mixture of air and nitrogen with stirring at a temperature of about 180° C. until oxidative degradation of the polymer reduced the viscosity of the mixture to about 4000 Saybolt Universal Seconds at 99° C. To 4000 parts of this oxidized polymer solution at 182° C. and under a nitrogen atmosphere were added, in one portion, 132 parts of the product of Example II. After 15 minutes, 68.6 parts of a 37.5% formaldehyde solution were added over a 45 minute period. The resulting mixture was stirred for two hours at 182° C. with a stream of nitrogen which was introduced at the bottom of the reaction vessel. The resulting product contained 1310 ppm of nitrogen and could be clarified by filtration through a combination of filter paper and a one inch bed of 535 Celite at a temperature of about 120° C.

EXAMPLE V

Example IV was repeated except that the amount of the product of Example II and the amount of formaldehyde solution were reduced to 88 parts and 46 parts respectively to give a product containing 828 ppm of nitrogen.

EXAMPLE VI

Example IV was repeated except that the amount of the product of Example II and the amount of formaldehyde solution were reduced to 66 parts and 34.3 parts respectively to give a product containing 572 ppm of nitrogen.

EXAMPLE VII

Example IV was repeated except that 100 parts of the product of Example III were used in place of the product of Example II and the amount of formaldehyde solution was reduced to 46 parts to give a product containing 1000 ppm of nitrogen. Addition of the product of Example III to the oxidized polymer solution required 12 minutes as consequence of foaming as water distilled off.

EXAMPLE VIII

Example IV was repeated except that 52 parts of hexamethylenediamine and 82 parts of the ammonium sulfonate described in Example I were individually added to the oxidized polymer in place of the product of Example II. The resulting product contained 989 ppm of nitrogen.

EXAMPLE IX

Example VI was repeated except that 26 parts of hexamethylenediamine and 41 parts of the ammonium sulfonate described in Example I were individually added to the oxidized polymer in place of the product of Example II. The resulting product contained 733 ppm of nitrogen.

EXAMPLE X

The spot dispersancy test gives a measure of the ability of a dispersant to disperse sludge and varnish when incorporated into a lubricating oil. In this test, a measured amount of the dispersant is mixed with a measured amount of crankcase lubricant oil which has been used in a Ford Sequence VC Engine Test for 192 hours. The mixture is heated with stirring at 300° F. (149° C.) for 16 hours. An aliquot of the resulting material is then spotted on a standard white blotter paper. Since dispersancy is reflected by the ability of the lubricant composition to keep sludge in suspension, dispersancy will also be reflected by the ratio of the diameters of the sludge and oil rings formed on the blotter paper. A spot dispersancy rating is obtained by dividing the diameter of the sludge ring by the diameter of the oil ring and multiplying by 100. A high numerical rating indicates good dispersancy.

The spot dispersancy ratings of the products of Examples IV-X are set forth in Table I. In addition, the haze before filtration of the products of Examples IV-X is also set forth in Table I using a scale ranging from A to E, with A representing a crystal clear material which is free of haze and E representing an extremely hazy material which is virtually opaque.

TABLE I

| Entry | Product of Example | Nitrogen Concentration, ppm | Haze Before Filtration | Spot Dispersancy Rating[a] |
|---|---|---|---|---|
| 1 | IV | 1310 | B | 91 |
| 2 | V | 828 | B | 89 |
| 3 | VI | 572 | A | 89 |
| 4 | VII | 1000 | C | 83 |
| 5 | VIII | 989 | E | 91 |
| 6 | IX | 756 | B | 76 |

[a]Carried out using a lubricant composition containing 15% of the test material.

The results which are set forth in Table I demonstrate that prereaction of the amine with the ammonium sulfonate affords a product having a substantially reduced haze prior to filtration (compare Entries 1-4 with Entries 5 and 6). The reduction in haze and sediment which is provided by the process of this invention is such that filtration is simplified and, in some cases, may be unnecessary. Filtration of the products of Examples IV-VII was very facile with little plugging of the filter. However, filtration of the corresponding products prepared by the prior art process (Examples VIII and IX) was much less facile, particularly at high nitrogen concentrations (see Entry 5, in Table I). Further, the results in Table I demonstrate that the use of a substantially anhydrous amine in the process of this invention results in a product which has better haze characteristics than that obtained through the use of an amine which contains significant amounts of water (compare Entry 2 with Entry 4). Finally, the results of Table I also show that prereaction of the amine with the ammonium sulfonate does not adversely affect the dispersancy of the Mannich product (compare Entries 1-4 with Entries 5 and 6). Indeed, when relatively large mole ratios of oxidized olefin polymer to amine are employed, prereaction of the amine with the ammonium sulfonate affords a product which has substantially improved dispersancy properties (compare Entry 3 with Entry 6).

We claim:
1. A process for the preparation of an oil-soluble condensation product which comprises:
(a) reacting at least one amine selected from the group consisting of primary and secondary aliphatic amines having from 1 to about 24 carbon atoms, aliphatic diamines of the formula $H_2N(CH_2)_xNH_2$ wherein x is an integer from 3 to about 10, and polyamines of the formula $H_2N(A-NH)_yH$ wherein A is a divalent alkylene radical of from 2 to about 6 carbon atoms and y is an integer from 1 to about 10, with at least one sulfur-containing material selected from the group consisting of oil-soluble sulfonic acids and their ammonium salts, wherein the ratio of equivalents of said sulfur-containing material to equivalents of said amine is from about 0.05 to about 10; and
(b) reacting the product of (a) with formaldehyde or a formaldehyde-yielding reagent and an oxidized polymer wherein said oxidized polymer is derived from an amorphous olefin polymer and has a number average molecular weight of at least about 3,000.

2. The process as set forth in claim 1 wherein said sulfur-containing material is selected from the group consisting of polyolefin-substituted benzene sulfonic acids having an equivalent weight in the range from about 250 to about 2,000 and their ammonium salts.

3. The process as set forth in claim 2 wherein said sulfur-containing material is selected from the group consisting of polypropylene-substituted benzene sulfonic acids having an equivalent weight in the range from about 400 to about 1,000 and their ammonium salts.

4. The process as set forth in claim 1 wherein said oxidized polymer is an oxidation product of a polymer which is derived from about 30 to about 80 mole percent ethylene and from about 20 to about 70 mole percent of at least one comonomer selected from the group consisting of olefins of the formula $R-CH=CH_2$ wherein R is an aliphatic group of from 1 to about 20 carbon atoms and diolefins of from 4 to about 25 carbon atoms.

5. The process as set forth in claim 4 wherein said oxidized polymer is an oxidation product of a polymer which is a copolymer of ethylene and propylene having an ethylene content of about 35 to about 80 mole percent and a propylene content of about 20 to about 65 mole percent.

6. The process as set forth in claim 5 wherein said copolymer has an ethylene content of about 55 to about 65 mole percent and a propylene content of about 35 to about 45 mole percent.

7. The process as set forth in claim 6 wherein said formaldehyde-yielding reagent is selected from the group consisting of formalin and paraformaldehyde.

8. The process as set forth in claim 7 wherein said amine is hexamethylenediamine.

9. The process as set forth in claim 1 wherein said amine and said sulfur-containing material are reacted at a temperature in the range from about 0° to about 250° C.

10. The process as set forth in claim 1 wherein said reaction of the product of (a) with formaldehyde or a formaldehyde-yielding reagent and an oxidized polymer is carried out at a temperature in the range from about 0° to about 300° C.

11. The process as set forth in claim 1 wherein said amine is substantially anhydrous.

12. The process as set forth in claim 1 wherein the ratio of oxidized polymer to formaldehyde or formaldehyde-yielding reagent to amine is in the range from about 1:25:25 to about 1:500:500, wherein said ratio is based on the number average molecular weight of the oxidized polymer and either the amount of formaldehyde or the potential amount of formaldehyde represented by said formaldehyde-yielding reagent.

13. The oil-soluble condensation product prepared by the process of claim 1.

* * * * *